United States Patent
Pasol et al.

(10) Patent No.: US 10,454,668 B2
(45) Date of Patent: Oct. 22, 2019

(54) FULLY HOMOMORPHIC ENCRYPTION FROM MONOID ALGEBRAS

(71) Applicant: CERTSIGN S.A., Bucharest (RO)

(72) Inventors: Vicentiu Pasol, Craiova (RO); Alexandru-Mugurel Barcău, Craiova (RO)

(73) Assignee: CERTSIGN SA, Bucharest (RO)

( * ) Notice: Subject to any disclaimer, the term of this patent is extended or adjusted under 35 U.S.C. 154(b) by 268 days.

(21) Appl. No.: 14/936,097

(22) Filed: Nov. 9, 2015

(65) Prior Publication Data

US 2017/0134158 A1    May 11, 2017

(30) Foreign Application Priority Data

Nov. 9, 2015 (EP) ................................. 15193706

(51) Int. Cl.
*H04L 9/00* (2006.01)
*H04L 29/06* (2006.01)
*H04L 9/30* (2006.01)

(52) U.S. Cl.
CPC ................ *H04L 9/008* (2013.01); *H04L 9/00* (2013.01); *H04L 9/30* (2013.01); *H04L 9/3066* (2013.01); *H04L 63/0428* (2013.01); *H04L 63/0435* (2013.01); *H04L 63/0442* (2013.01)

(58) Field of Classification Search
CPC ......... H04L 9/008; H04L 9/3066; H04L 9/30; H04L 9/00; H04L 63/0428; H04L 63/0435; H04L 63/0442
See application file for complete search history.

(56) References Cited

U.S. PATENT DOCUMENTS

| | | | |
|---|---|---|---|
| 8,630,422 B2 | 1/2014 | Gentry | |
| 8,861,716 B2 | 10/2014 | Halevi et al. | |
| 2010/0246812 A1* | 9/2010 | Rane | H04L 9/302 380/28 |
| 2011/0110525 A1* | 5/2011 | Gentry | H04L 9/0822 380/285 |
| 2012/0039473 A1 | 2/2012 | Gentry et al. | |
| 2013/0208887 A1* | 8/2013 | Anshel | H04L 9/008 380/255 |
| 2017/0134158 A1 | 5/2017 | Pasol et al. | |

OTHER PUBLICATIONS

Yi et al., "Homomorphic Encryption and Applications", Springer, Sep. 2014, 136 pages.*

(Continued)

*Primary Examiner* — Jeffrey D. Popham
(74) *Attorney, Agent, or Firm* — White & Case LLP (57) ABSTRACT

A blueprint that produces a family of FHE schemes given any homomorphic monoidal encryption scheme. The ciphertext space is a subspace of the monoid algebra over $F_2$ generated by the initial encryption monoid. The method can be generally applied to any monoid encryption schemes. Advantageously, monoid encryption schemes produce efficient FHE schemes with the inventive blueprint. Furthermore, the corresponding FHE scheme can correctly decrypt and efficiently compute circuits with low (polynomial in the security parameter) additive depth, a feature not realized by prior encryption methods.

16 Claims, 3 Drawing Sheets

---

(21) Having a monoid homomorphic encryption (G, H, E, D), embed the plaintext space R→ A and a homomorphism of monoids H→ (A, ×).

↓

(22) Construct $t_1, t_2, \ldots, t_r$ in the image of H such that $A=R[t_1, t_2, \ldots, t_r]$.

↓

(23) For m∈ R, find $k_1, \ldots, k_r \in$ R such that $m = k_1 t_1 + \ldots + k_r t_r$.
Set Enc(m) := $k_1 [E(t_1)] + \ldots + k_r [E(t_r)] \in R[G]$.

↓

(24) For c= $k_1 [g_1] + \ldots + k_r [g_r] \in$ R[G], set Dec(c):= = $k_1 D(g_1) + \ldots + k_r D(g_r)$.

(56) References Cited

OTHER PUBLICATIONS

Armknecht, et al., "Group Homomorphic Encryption: Characterizations, Impossibility Results, and Applications," Designs, Codes and Cryptography, vol. 67(2): 209-232 (2013).
Bellare, et al., "A Concrete Security Treatment of Symmetric Encryption," Proceedings of the 38th Symposium on Foundations on Computer Science, IEEE, 394-403 (1997).
Benaloh, J., "Dense Probabilistic Encryption," Proceedings of the Workshop on Selected Areas of Cryptography, 120-128 (1994).
Brakerski and Vaikuntanathan, "Efficient Fully Homomorphic Encryption from (Standard) LWE," IEEE 52nd Annual Symposium on Foundations of Computer Science, FOCS 2011, Palm Springs, 97-106 (2011).
Brakerski, Z., "Fully Homomorphic Encryption without Modulus Switching from Classical GapSVP," CRYPTO 2012, Lecture Notes in Computer Science, vol. 7417: 868-886 (2012).
Brakerski, et al., "Fully homomorphic encryption without bootstrapping," Innovations in Theoretical Computer Science (ITCS'12), 2012, Available at http://eprint.iacr.org/2011/277.
Coron, et al., "Fully Homomorphic Encryption over the Integers with Shorter Public Keys," Advances in Cryptology, CRYPTO 2011—31st Annual Cryptology Conference, Santa Barbara 2011, Lecture Notes in Computer Science, vol. 6841: 487-504, Springer (2011).
Van Dijk, et al., Fully Homomorphic Encryption over the Integers, EUROCRYPT 2010, Lecture Notes in Computer Science, vol. 6110: 24-43 (2010).
Ducas and Micciancio, "FHEW: Homomorphic Encryption Bootstrapping in Less than a Second," Advances in Cryptology, EUROCRYPT 2015, Lecture Notes in Computer Science, vol. 9056: 617-640 (2015).
Fellows and Koblitz, "Combinatorial cryptosystems galore!," Finite Fields: Theory, Applications, and Algorithms, vol. 168 of Contemporary Mathematics, 51-61 (1994).
Gentry, C., "A Fully Homomorphic Encryption Scheme," PhD thesis, Stanford University (2009).
Gentry, C., "Fully Homomorphic Encryption Using Ideal Lattices," STOC '09: 169-178 (2009).
Gentry, C., "Computing Arbitrary Functions of Encrypted Data," Communications of the ACM, vol. 53(3): 97-105 (2010).
Gentry and Halevi, "Implementing Gentry's Fully-Homomorphic Encryption Scheme," Advances in Cryptology, Proceedings of EUROCRYPT 2011, Lecture Notes in Computer Science, vol. 6632: 129-148, Springer (2011).
Gentry, et al., "Homomorphic Encryption from Learning with Errors: Conceptually-Simpler, Asymptotically-Faster, Attribute-Based," Advances in Cryptology, CRYPTO 2013, Lecture Notes in Computer Science, vol. 8042: 75-92 (2013).
Goldreich, et al., "Public-Key Cryptosystems from Lattice Reduction Problems," Advances in Cryptology, CRYPTO 1997, Lecture Notes in Computer Science, vol. 1294: 112-131, Springer (1997).
Goldwasser and Micali, "Probabilistic Encryption," Journal of Computer and System Sciences vol. 28: 270-299 (1984).
Grigoriev and Ponomarenko, "Homomorphic Public-Key Cryptosystems over Groups and Rings," Quaderni di Mathematica, vol. 13: 304-325 (2004).
Halevi and Shoup, "Algorithms in HElib," Advances in Cryptology, CRYPTO 2014, Part I, Lecture Notes in Computer Science, vol. 8616: 554-571, Springer, (2014).

Halevi and Shoup, "Bootstrapping for HElib," IACR Cryptology (2015).
Hoffstein, et al., "NSS: an NTRU lattice-based signature scheme," Advances in Cryptology, EUROCRYPT 2001, Lecture Notes in Computer Science, vol. 2045: 211-228, Springer (2001).
Hoffstein, et al., "NTRU: A Ring Based Public Key Cryptosystem," Algorithmic Number Theory (ANTS III), Lecture Notes in Computer Science, vol. 1423: 267-288 (1998).
Regev, O., "On Lattices, Learning with Errors, Random Linear Codes, and Cryptography," STOC: 84-93 (2005).
Rothblum, R., "Homomorphic Encryption: From Private-Key to Public-Key," Theory of Cryptography, Lecture Notes in Computer Science, vol. 6597: 219-234 (2011).
Rivest, et al., "A Method for Obtaining Digital Signatures and Public-Key Cryptosystems," Communications of the ACM, vol. 21(2): 120-126 (1978).
Rivest, et al., "On data banks and privacy homomorphisms," Foundations of Secure Computation, Academic Press, 169-177 (1978).
Schölten and Vercauteren, "An Introduction to Elliptic and Hyperelliptic Curve Cryptography and the NTRU Cryptosystem," State of the Art in Applied Cryptography, COSIC '03, Lecture Notes in Computer Science, 24 pages (2004).
Sen, J., "Homomorphic Encryption: Theory & Application," Theory and Practice of Cryptography and Network Security Protocols and Technologies, 1-31 (2013). available at http://arxiv.org/abs/1305.5886.
Shoup, V., "Lower Bounds for Discrete Logarithms and Related Problems," Advances in Cryptology, EUROCRYPT '97, Lecture Notes in Computer Sciences, vol. 1233: 256-266, Springer (1997).
Smart and Vercauteren, "Fully Homomorphic Encryption with Relatively Small Key and Ciphertext Sizes," Public Key Cryptography, Lecture Notes in Computer Science, vol. 6056: 420-443, Springer (2010).
Halevi and Shoup, "Bootstrapping for HElib," IACR Cryptology (28 pages) (2015). [HS14b].
Vasco, et al., "Pitfalls in public key cryptosystems based on free partially commutative monoids and groups", International Association for Cryptologic Research vol. 20040123:075640, Jan. 23, 2004 (Jan. 23, 2004), pp. 1-6, XP061001183.
Perret, Ludovic: "A Chosen Ciphertext Attack on a Public Key Cryptosystem Based on Lyndon Words", International Association for Cryptologic Research vol. 20050120:193625, Jan. 20, 2005 (Jan. 20, 2005), pp. 1-10, XP061001229.
Garber, David: "Braid Group Cryptography", arxiv.org, Cornell University Library, 201 Olin Library Cornell University Ithaca, NY 14853, Nov. 26, 2007 (Nov. 26, 2007), XP080340865.
Patra, et al: "An Algebraic Characterization of Security of Cryptographic Protocols", arxiv.org, Cornell University Library, 201 Olin Library Cornell University Ithaca, NY 14853, Feb. 22, 2008 (Feb. 22, 2008), XP080401620.
Bakke, Koloen Torris, et al.: "Hopf algebras and monoidal categories", 1-76, May 1, 2007 (May 1, 2007), XP055341802, D6 Retrieved from the Internet: URL:http://munin.uit.no/bitstream/handle/10037/1084/finalthesis. Pdf [retrieved on Feb. 2, 2017].
Barcau, et al., The Category of Fully Homomorphic Encryption, work in progress (4 pages) Aug. 2014 [BPCat].
Pasol, et al., Classifying Fully Homomorphic Encryption Schemes, preprint (7 pages) Aug. 2014 [PaClass].

\* cited by examiner

(31) Take $n=O(\lambda^2)$ and $s,d= O(\lambda)$ such that Simplex$(s,d,n,\varepsilon)$ ←X.
Fix a secret key, Sk, a subset of $\{1,\ldots,n\}$ of length s. Set $G=F_2^n$, and $H=(F_2,\times)$ (32) To encrypt 0, choose a random k according to X,
k random elements in Sk and d-k random elements not in Sk.
To encrypt 1, choose d random elements not in Sk.
Set E(m) to be the vector in G with 0 on all the chosen positions and 1 in rest.

(33) Fix $v\in$ G. Set D(v) to be 0 if v has at least one component equal to 0 on a position in Sk and 1 otherwise.

Fig. 3

(41) Fix $n=O(\lambda)$. Fix $s<d<n$. Choose a probability vector $X=(X(0),\ldots,X(d))$ and a set of probabilities $p_k=(p_{i,k})_{i\notin Sk}$, $p_k^{Sk}=(p_{i,k})_{i\in Sk}$.

(42) Put $P_p(X)=\Pi_i(1+ p_i X)$ for any set of probability vector $p$. For each i, put $f_i:=\sum_{k=0}^d X(k)\, p_{i,k}\, \frac{C_{k-1}(p_k^{Sk,(i)})}{C_k(p_k^{Sk})}\frac{C_{d-k-1}(p_k^{(i)})}{C_{d-k}(p_k)}$, where $C_m(p)$ represent the coefficient of $X^m$ in $P_p$ and $p^{(i)}$ represents the vector with the $i^{th}$ position removed.

(43) Set up algorithm to produce produce X, $p_k$, $p_k^{Sk}$ such that $f_i$ remain clustered.

Fig. 4

(51) Fix $N=O(\lambda)$. Fix $s<d<n$. Choose a probability vector $X=(X(0),\ldots,X(d))$ and a set of probabilities $p_k=(p_{i,k})_{i\notin Sk}$, $p_k^{Sk}=(p_{i,k})_{i\in Sk}$.

↓

(52) For each i, put
$$Q_i(d,p) := \sum_{k=0}^{d-1} \sum_{(j_1,\cdots,j_k)} \left(\prod_{s=1}^{k} \frac{p_{j_s}}{1-p_{j_1}-\cdots-p_{j_{s-1}}}\right) \frac{p_i}{1-p_{j_1}-\cdots-p_{j_k}}.$$
Set $f_i = \sum_{k=0}^{d} X(k)\, Q_i(d-k, p_k) Q_i(k, p_k^{Sk})$.

↓

(53) Set up algorithm to produce $X, p_k, p_k^{Sk}$ such that $f_i$ remain clustered.

Fig. 5

(61) Take $N=O(\lambda)$ and $d<s<N$. Fix a secret key, Sk, a subset of $\{1,\ldots,N\}$ of length s. Set $G=F_2^N$, and $H=(F_2,\times)$. Fix a set of probability $X=(X(0),\ldots,X(d))$ and a set of probabilities $p_k=(p_{i,k})_{i\notin Sk}$, $p_k^{Sk}=(p_{i,k})_{i\in Sk}$ as in the Fig. 4 or Fig. 5

↓

(62) Fix $m\in H$. To encrypt 0, choose a random k according to X, k random elements in Sk according to $p_k^{Sk}$ and d-k random elements not in Sk according to $p_k$. To encrypt 1, choose d random elements not in Sk according to $p_0$. Set E(m) to be the vector in G with 0 on all the chosen positions and 1 in rest.

↓

(63) Fix $v \in G$. Set D(v) to be 0 if v has at least one component equal to 0 on a position in Sk and 1 otherwise.

Fig. 6

FULLY HOMOMORPHIC ENCRYPTION FROM MONOID ALGEBRAS

FIELD OF THE INVENTION

The present invention is directed to methods for processing a message. Yet more specifically, the present invention is directed to methods and systems for secure transmittal of information which is encrypted and decrypted using fully homomorphic encryption and decryption methods.

BACKGROUND OF THE INVENTION

Homomorphic encryption is a form of encryption that allows (some) computations to be carried out on ciphertext, thus generating an encrypted result which, when decrypted, matches the result of operations performed on the plaintext. A fully homomorphic encryption scheme (FHE) allows a computer to receive encrypted data and perform arbitrarily chosen computations on that data while it remains encrypted, without requiring the use of a decryption key. This concept, originally called a privacy homomorphism, was introduced by Rivest, Adleman and Dertouzos in [RAD78], shortly after the development of RSA [RSA78]. Many known public-key cryptosystems, like RSA, support one operation (either addition or multiplication) of encrypted data; supporting both operations at the same time is a much more difficult problem, and until recently, all attempts at constructing fully homomorphic encryption schemes turned out to be insecure.

In the early 1990's, Fellows et al. [FK94] proposed a first algorithm, PolyCracker, which is capable of performing algebraic computations on encrypted data without revealing the encrypted information. However, several years later, the algorithm proved to be insecure and attempted modifications to make the algorithm secure were not successful.

In the late 1990's, a secure and efficient algorithm to encode messages (NTRU) was proposed by [HPS98]. The algorithm has the same ring homomorphic feature (defined further below) as PolyCracker, but only a few operations can be performed on the encrypted data. Specifically, only a few additions and no multiplications are allowed. This "leveled" feature comes from the fact that the algorithm is an "error" based one, so that only circuits which keep the noise very low can be applied to the encrypted data.

In his thesis [GeTh09], C. Gentry described the first construction of a fully homomorphic cryptosystem that supports both addition and multiplication. Gentry's general recipe that produces fully homomorphic encryption schemes consists of several steps. First, one considers a probabilistic homomorphic encryption scheme. A probabilistic scheme is an encryption scheme that assigns to each message several different ciphertexts. One way of obtaining probabilistic schemes is by constructing encryption algorithms that depend on certain random quantities, called errors. Such encryption schemes are also called error-based encryption schemes. In general, a homomorphic encryption scheme is somewhat homomorphic, that is it can "handle" (i.e. decrypt correctly) low-degree polynomials on the encrypted data. Next, one squashes the decryption algorithm such that it can be expressed by a low-degree polynomial supported by the scheme, in which case the scheme is called bootstrappable. Finally, Gentry describes a bootstrapping transformation that allows conversion of a boostrappable scheme into a fully homomorphic encryption scheme ([Ge11]). The bootstrapping transformation involves a recryption procedure in which the scheme's decryption algorithm is evaluated homomorphically. Gentry applied in [GeTh09] (see also [Ge09]) this general recipe to a GGH-type scheme [GGH97] over ideal lattices. A significant research effort has been devoted to increase the efficiency of the implementation of this scheme [GH11], [SV10].

The main building block in Gentry's construction, that is, the somewhat homomorphic encryption scheme, was based on the hardness of problems on ideal lattices. Starting with the seminal work of Z. Brakerski and V. Vaikuntanathan [BV11], a new generation of fully homomorphic encryption schemes were constructed. The security of these schemes is based on the learning with error (LWE) assumption (more generally on the ring learning with error (RLWE) assumption) that is known to be at least as hard as solving hard problems in general lattices [R05]. To obtain (leveled) fully homomorphic encryption schemes, the authors introduced the so-called re-linearization technique. In [BGV12], the construction is refined using a modulus-switching technique to obtain better efficiency.

Currently, perhaps the simplest (leveled) FHE scheme based on the learning with errors assumption is by Z. Brakerski [Br12]. The most recent achievement in this direction was obtained in [GSW13], where the authors were able to construct a simpler (leveled) FHE scheme based on the LWE assumption by removing the extensive and complicated step that involves the re-linearization procedure.

The current state of the art in terms of FHE implementation is represented by a recent software library (HElib) of S. Halevi and V. Shoup, available at https://github.com/shaih/HElib. HElib is an implementation of the RLWE encryption scheme described in [BGV12], along with many other optimizations [HS14a]. To achieve FHE, the authors implemented a new recryption procedure with running times around 6 minutes [HS14b]. The fact that bootstrapping takes such a large amount of time makes this implementation of FHE unattractive. Future work in this direction will focus on minimizing the running time of the FHE bootstrapping procedure [DM15].

There appears to be only a single example of a ring homomorphic encryption scheme (as defined below), provided by Grigoriev and Ponomarenko [GP04]. More precisely, they disclosed the use of the theory of group algebras to produce cryptosystems over any field of odd characteristic. Consequently, they explicitly mention that their method cannot produce FHE schemes. In addition, even in the odd characteristic case, they do not give a concrete description of those schemes. More precisely, the encryption algorithm is not described and is only assumed to exist.

SUMMARY OF THE INVENTION

The present invention is intended to overcome, or at least address, the above-described deficiencies of the prior art. The present invention uses an entirely different approach than those disclosed by others, including Gentry et al. Specifically, the present invention uses monoid algebras and/or character theory to provide a family of fully homomorphic encryption (FHE) schemes.

An object of the present invention is provide new encryption methods that allow for accurate and secure transmission of information from one party to another in a manner which makes the information unreadable by unauthorized individuals. In view of this object, the present invention provides computer-implemented methods for encrypting and decrypting a message, computer-implemented methods for encrypting a message and for decrypting a message, a computer-readable storage device, an encryption system, and non-transitory computer-readable storage medium having the features of the invention as further discussed below.

According to the invention, by using the fully homomorphic encryption and decryption schemes disclosed herein, messages can be readily encrypted without requiring heavy computer processor power and transmitted in a secure manner to a recipient who can decrypt the message to retrieve the information in its original format. The system is secure against unauthorized access since brute force attack of the encryption and decryption schemes requires computer power which is far beyond today's (or near future) processing capacity, thereby making such attacks highly unlikely to succeed.

For convenience, the information to be digitally encrypted will be termed a message, and it is to be understood that any kind of digital information without restriction can be considered a message for encryption: for example, banking information such as credit card numbers and financial payments; confidential diplomatic and consular communications: and secure business communications such as trade secrets. "Messages" as used herein also envisages information exchanged between mobile telecommunication devices such as smartphones. Also information received by and transmitted from vehicles such as aircraft, land or water vehicles are envisaged as "messages" herein.

The present invention constructs a blueprint that produces a family of FHE schemes given any (one operation) homomorphic (monoidal) encryption scheme. In one embodiment, the ciphertext space is a subspace of the monoid algebra over $F_2$ generated by the initial encryption monoid.

The examples presented below exemplify the workings of the blueprint, and the principles of the invention are intended to be generally applicable for all monoid encryption schemes. Moreover, monoid encryption schemes produce the most efficient FHE schemes using the novel blueprint.

In one embodiment of the invention, the FHE scheme can correctly decrypt and efficiently compute any circuit which has low (polynomial in the security parameter) additive depth. This advantageous feature of the invention provides enhanced efficiency over prior known methods.

One aspect of the present invention is directed to a computer-implemented method for processing a message comprising the steps of receiving the message for encryption, and encrypting the message by applying a monoid algebra based homomorphic encryption scheme with a key to obtain an encrypted message.

An embodiment of the inventive method may further comprise the step of sending an encrypted message to a recipient, wherein a decryption operation applied to the encrypted message behaves homomorphically to both addition and multiplication operations.

In an embodiment of the inventive method, the (monoid algebra based) homomorphic encryption scheme may comprise an encryption algorithm which is $Enc(m)=\Sigma\, r_i\, [E(h_i)]$, wherein:
  the homomorphic encryption scheme is (M, A, Enc, Dec.);
  S is the image of $\chi$ in A;
  r is part of a fixed tuple $(r_1, \ldots, r_k) \in R^k$, where $k \geq 1$;
  the set that contains all the elements of the form $\Sigma\, r_i\, s_i$ and $s_i \in S$ is the whole R-algebra A; and
  plaintext $m \in A$ is $(h_1, \ldots, h_k) \in H^k$ such that $m = \Sigma\, r_i\, \chi(h_i)$ The inventive method may further comprise the step of decrypting the encrypted message by the recipient using a decryption algorithm which behaves homomorphically to both addition and multiplication operations.

In an embodiment of the inventive method, the decryption algorithm is $Dec(\Sigma_{g \in G}\, a_g\, [g]) = \Sigma_{g \in G}\, a_g\, \chi(D(g))$, and the decryption step behaves homomorphically to both addition and multiplication operations.

In embodiments of the invention, encryption and decryption in the inventive method may be symmetric using an identical key; or asymmetric using a public key and a secret key. In one embodiment of the invention, the secret key is a bit vector comprising a plurality of bits.

In embodiments of the invention, the message to be encrypted may be written as a linear combination of post messages, individual messages, or submessages, and the encrypted message may be obtained as a linear combination of encrypted post messages, individual messages, or submessages.

Embodiments of the inventive method may comprise the steps of compressing an encrypted message to reduce its size; and sending the compressed encrypted message to a recipient.

Embodiments of the method may comprise the steps of dividing an encrypted message into two or more message parts, and sending the encrypted message parts together or separately to the recipient. Further embodiments may also comprise the steps of receiving and decrypting the encrypted message parts by the recipient, and combining the decrypted message parts to obtain the original message.

In an embodiment of the inventive method, encryption and decryption operations may be performed by separate computers which are linked by a network.

An embodiment of the inventive method may further comprise the steps of converting the encrypted message at a circuit into a polynomial by replacing an AND gate with multiplication and an XOR gate with addition; and evaluating the resulting polynomial.

An embodiment of the inventive method may further comprise applying a component-wise probabilistic multiplicative homomorphic encryption scheme onto a multiplicative monoid of the field with two elements during encryption, wherein the ciphertext space G consists of bit vectors of length $\lambda$.

Another aspect of the present invention is directed to a computer-implemented method for processing a message. The method may comprise the steps of receiving the message to be encrypted; encrypting the message by applying a monoid algebra based homomorphic encryption scheme with a key to obtain an encrypted message; sending the encrypted message to a recipient; and decrypting the encrypted message by the recipient using a decryption algorithm, wherein the decryption step behaves homomorphically to both addition and multiplication operations.

Another aspect of the present invention is directed to a non-transitory computer-readable storage device tangibly embodying a program of computer code instructions which, when executed by a processor, cause the processor to perform a method comprising the steps of: receiving a message for encryption; encrypting the message by applying a monoid algebra based homomorphic encryption scheme with a key to obtain an encrypted message; and sending the encrypted message to a recipient, wherein the decryption step behaves homomorphically to both addition and multiplication operations.

In an embodiment of the invention, the non-transitory computer-readable storage device also tangibly embodies computer code instructions for the step of decrypting the encrypted message by the same or different processor using a decryption algorithm, wherein the decryption step behaves homomorphically to both addition and multiplication operations.

In an embodiment of the invention, the non-transitory computer-readable storage device also tangibly embodies computer code instructions for a monoid algebra based homomorphic encryption scheme which comprises an encryption algorithm which is $Enc(m)=\Sigma\, r_i\, [E(h_i)]$, wherein:
the homomorphic encryption scheme is (M, A, Enc, Dec.);
S is the image of $\chi$ in A;
r is part of a fixed tuple $(r_i, \ldots, r_k) \in R^k$, where $k \geq 1$;
the set that contains all the elements of the form $\Sigma\, r_i\, s_i$ and $s_i \in S$ is the whole R-algebra A; and
plaintext $m \in A$ is $(h_1, \ldots, h_k) \in H^k$ such that $m = \Sigma r_i \chi(h_i)$.

In an embodiment of the invention, the non-transitory computer-readable storage device also tangibly embodies a program of computer code instructions for performing the operation of decrypting the encrypted message by the recipient using a decryption algorithm which is: $Dec(\Sigma_{g \in G}\, a_g\, [g]) = \Sigma_{g \in G}\, a_g\, \chi(D(g))$.

Another aspect of the present invention is directed to a message processing system which comprises an electronic apparatus comprising a processor, circuitry, memory, and a communications component; and an embodiment of the inventive the non-transitory computer-readable storage device disclosed herein.

In an embodiment of the present invention, the disclosed method or non-transitory computer-readable storage device or message processing system may comprise a decryption step, Dec, which is according to: $Dec(\Sigma_{g \in G}\, a_g\, [g]) = \Sigma_{g \in G}\, a_g\, \chi(D(g))$.

In accordance with one exemplary aspect of the invention, a method for fully homomorphic encryption is provided. The method comprises providing an encryption scheme which supports a homomorphic operation on encrypted data and a multiplicative character from the plaintext space of the encryption scheme to the multiplicative monoid of the want-to-be encrypted plaintext space. The method encrypts data and supports any algebraic circuit computation on encrypted data. Specifically, given a monoid encryption scheme $G \rightarrow H$ on which the encryption and decryption algorithms are respectively denoted by E and D and any nontrivial character $\chi : H \rightarrow (A, \bullet)$ where A is a (semi)ring over the ring R and also any embedding of the plaintext space P in A, $\iota : P \rightarrow A$ such that A is generated as an R-algebra by the image of $\chi$, the encryption algorithm $Enc : P \rightarrow R[G]$ runs as follows: for a plaintext m in P, let $a_1, \ldots, a_d$ in $\chi(H)$ such that $m = k_1 a_1 + \ldots + k_d a_d$ in A and $k_1, \ldots, k_d$ in R, put $Enc(m) := k_1 E(\chi^{-1}(a_1)) + \ldots + k_d E(\chi^{-1}(a_d))$; the decryption algorithm $Dec : R[G] \rightarrow A$ is given by $Dec(c) = Dec(k_1 g_1 + \ldots + k_d g_d) := k_1 \chi(D(g_1)) + \ldots + k_d \chi(D(g_d))$. The decryption algorithm behaves homologically in respect of both, multiplication and addition operations, when the multiplication and/or addition operations are applied to the encrypted message.

In another exemplary embodiment of the invention, a multiplicative homomorphic scheme is provided. The scheme involves applying an encryption scheme $(G, (F_2, \bullet), E, D)$ onto the multiplicative monoid of the field with two elements on which the ciphertext space G consists of bit vectors of length $n(\lambda)$ with componentwise multiplication. Given a plaintext (bit) m and a secret key (sk) consisting of a vector of length $n(\lambda)$ with s zero components, then $E(m)$ consists of a random vector with d components equal to 0 such that at least one of them coincides with the zeroes of the secret key if $m=0$ and none of them coincide with the zeroes of the secret key if $m=1$. As for decryption, given a vector v in G, the decryption $D(v)$ is 0 if v has at least a common zero with sk and 1 otherwise.

In another exemplary embodiment of the invention, a probabilistic multiplicative scheme $(G, (F_2, \bullet), E, D)$ is applied to the multiplicative monoid of the field with two elements on which the ciphertext space G consists of bit vectors of length $n(\lambda)$ with component-wise multiplication. The secret key consists of (a) a vector of length $n(\lambda)$ with s components equal to 0, and (b) a vector v of length $n(\lambda)$, and has components with certain probabilities of occurrences of a zero on each position, i.e. the components are particular numbers $(p_i)$ for each i in $[1, n(\lambda)]$ such that $\Sigma\, p_i\, sk[i]=1$ and $\Sigma\, p_i\, (1-sk[i])=1$ and such that the vector v has indistinguishable ordering that could reveal the sk. The encryption and decryption algorithms are as described above, with the exception that a zero on a component i is drawn with the probability $p_i$.

One aspect of the present invention is directed to a computer-implemented method for encrypting and decrypting a message. The method comprises the steps of: receiving the message to be encrypted;
encrypting the message using an encryption algorithm using a key to obtain an encrypted message, wherein the encryption algorithm is $Enc(m) = \Sigma\, r_i\, [E(h_i)]$, wherein the homomorphic encryption scheme is (M, A, Enc, Dec.); S is the image of $\chi$ in A; r is part of a fixed tuple $(r_1, \ldots, r_k) \in R^k$, where $k \geq 1$; the set that contains all the elements of the form $\Sigma\, r_i\, s_i$ and $s_i \in S$ is the whole R-algebra A; and plaintext $m \in A$ is $(h_1, \ldots, h_k) \in H^k$ such that $m = \Sigma\, r_i \chi(h_i)$;
sending the encrypted message to a recipient; and
decrypting the encrypted message by the recipient using a decryption algorithm which follows $Dec(\Sigma_{g \in G}\, a_g\, [g]) = \Sigma_{g \Sigma G}\, a_g\, \chi(D(g))$.

The encryption algorithm is so constructed that the decryption step behaves homomorphically to both addition and multiplication operations.

The message to be encrypted may be written as a linear combination of post messages. That is, the message to be encrypted may be written as a plurality of individual messages or submessages which are joined in a linear manner to form a single message for subsequent encryption. The inventive method may consequently provide the resultant encrypted message as a linear combination of encrypted post messages, individual messages, or submessages.

The method may further comprise the steps of converting an encrypted message at a circuit into a polynomial by replacing an AND gate with multiplication and an XOR gate with addition; and evaluating the resulting polynomial. Such steps allow detection of errors and verification of correct transmission of encrypted messages.

Encryption and decryption by the method may be symmetric using an identical key for both procedures. Alternatively, encryption and decryption may be asymmetric using a public key and a secret key. If a secret key used, the secret key may be/is a bit vector comprising a plurality of bits.

The method may further comprise the steps of compressing an encrypted message to reduce its size; and sending the compressed encrypted message to a recipient. Compression can be performed using known algorithms in the art, such as but not limited to ZIP, RAR, LZMA, or PAQ. The recipient would decompress the compressed encrypted message before applying the decryption algorithms according to the present invention.

The method may further comprise the steps of dividing an encrypted message into two or more message parts, and sending the encrypted message parts together or separately to the recipient. For example, a message can divided into halves or thirds and be sent to a recipient separately or over separate communications lines or channels. Sending an encrypted message (for example, a credit card number) as separate message parts or over separate channels allows for enhanced security of the message by reducing the chances an unauthorized recipient will be able to receive and decode an entire message. Furthermore, even if the unauthorized recipient is able to decode a part of a message, the unauthorized recipient will still not possess the entire message and therefore will not be able to act upon any information contained therein.

When a message is sent as separate encrypted message parts, the recipient will receive and decrypt the encrypted message parts, and combine the decrypted message parts to obtain the original message. Using the example of a credit card number, the recipient can receive a first encrypted message comprising the first half of a credit card number, and a second encrypted message comprising the second half of the credit card number. The recipient will decrypt the two message parts and reassemble the original credit card number for subsequent handling. Alternatively, the recipient can first reassemble the original encrypted message by combining the two encrypted parts, and then decrypt the combined encrypted message to obtain the original message (such as the credit card number).

Depending upon the particular implementation of the invention, the encryption and decryption steps can be performed by separate computers which are linked by a network. The computers can function as peers or in a client/server relationship. Alternatively, encryption and decryption can be performed by the same computer. Encryption and decryption can take place in real time, for example, in order to receive authorization for a customer's credit card purchase, or messages can be stored in computer memory for later encryption and decryption.

In an embodiment of the invention, encryption comprises a monoid homomorphic encryption scheme. The encryption algorithm may also construct clustered relative frequencies for a particular selection of d-tuples.

An embodiment of invention may comprise applying a componentwise multiplicative homomorphic encryption scheme onto a multiplicative monoid of the field with two elements during encryption, wherein the ciphertext space G consist of bit vectors of length $\lambda$.

The invention may further comprising applying a component-wise probabilistic multiplicative homomorphic encryption scheme onto a multiplicative monoid of the field with two elements during encryption, wherein the ciphertext space G consists of bit vectors of length $\lambda$.

Another aspect of the present invention provides a computer-implemented method for encrypting a message. The method may comprise the steps of: receiving the message for encryption; encrypting the message using an encryption algorithm using a key to obtain an encrypted message; and sending the encrypted message to a recipient.

In one embodiment, the encryption algorithm is $\text{Enc}(m)=\Sigma\, r_i\, [E(h_i)]$, wherein the homomorphic encryption scheme is (M, A, Enc, Dec.); S is the image of $\chi$ in A; r is part of a fixed tuple $(r_1, \ldots, r_k)\in R^k$, where $k\geq 1$; the set that contains all the elements of the form $\Sigma\, r_i\, s_i$ and $s_i\in S$ is the whole R-algebra A; and plaintext $m\in A$ is $(h_1, \ldots, h_k)\in H^k$ such that $m=\Sigma\, r_i\, \chi(h_i)$.

The method may further comprising the separate step of decrypting the encrypted message by the recipient using a decryption algorithm. In one embodiment, the decryption algorithm follows $\text{Dec}(\Sigma_{g\in G}\, a_g\, [g])=\Sigma_{g\in G}\, a_g\, \chi(D(g))$. The decryption step behaves homomorphically to both addition and multiplication operations.

Another aspect of the present invention is directed to a computer-readable storage device tangibly embodying a program of instructions for encrypting a message. The storage device can be installed in a computer, and the program may be configured to perform the operations of: receiving the message to be encrypted; encrypting the message using an encryption algorithm using a key to obtain an encrypted message; sending the encrypted message to a recipient; and decrypting the encrypted message by the recipient using a decryption algorithm.

In an embodiment of the invention, the program of instructions for encrypting the message comprises computer code for an encryption algorithm which is: $\text{Enc}(m)=\Sigma\, r_i\, [E(h_i)]$, wherein: the homomorphic encryption scheme is (M, A, Enc, Dec.); S is the image of $\chi$ in A; r is part of a fixed tuple $(r_1, \ldots, r_k)\in R^k$, where $k\geq 1$; the set that contains all the elements of the form $\Sigma\, r_i\, s_i$ and $s_i\in S$ is the whole R-algebra A; and plaintext $m\in A$ is $(h_1, \ldots, h_k)\in H^k$ such that $m=\Sigma\, r_i\, \chi(h_i)$.

In an embodiment of the invention, the program of instructions for decrypting the encrypted message comprises computer code for a decryption algorithm which is: $\text{Dec}(\Sigma_{g\in G}\, a_g\, [g])=\Sigma_{g\in G}\, a_g\, \chi(D(g))$, wherein the decryption step behaves homomorphically to both addition and multiplication operations.

Another exemplary embodiment of the invention provides an efficient fully homomorphic encryption scheme which is constructed using the multiplicative homomorphic scheme and the method disclosed above. Specifically, freshly encrypted ciphertexts are encryptions E(m) for the inventive algorithm.

DETAILED DESCRIPTION

I. Homomorphic Encryption Schemes

Homomorphic encryption schemes are discussed by a number of different authors. For example, [Sen] provides a monograph treatment of the subject and [AK13] discusses a treatment of their security behavior.

General encryption schemes are composed of three algorithms: KeyGen, Enc, and Dec, and two sets: the plaintext space P and the ciphertext space C. Generally, given a security parameter X, one first generates a secret and a public key (sk, pk) by KeyGen. The next two algorithms, Enc and Dec, describe how to associate to a plaintext m∈P a ciphertext c=Enc(m)∈C using the public key pk, and vice versa, that is, using the secret key sk, how to associate to a ciphertext c∈C a plaintext m=Dec(c), such that Dec(Enc(m))=m. Since the key generation is made explicitly, the existence of this algorithm in all of the encryption schemes discussed below is to be understood even if it is not expressly mentioned in the notation. Such short encryption schemes will be identified by the quadruple (C, P, Enc, Dec).

Definition 1: Let Struc be an algebraic structure, such as a semigroup, monoid, group, ring, etc. A Struc homomorphic encryption scheme (G, H, Enc, Dec) is an encryption scheme such that both plaintext space H and ciphertext space G are endowed with the structure Struc and such that Dec: G→H is a Struc homomorphism.

It is to be noted that different authors give different names for such an encryption scheme, all of them bearing the name homomorphic. Some authors identify the above schemes as group homomorphic encryption schemes without requiring that the plaintext (or the resultant ciphertext) space to be an actual group but only to have operations compatible with the decryption algorithm. In accordance with the principles of the present invention, such schemes would be identified as semi-group homomorphic encryption schemes.

It can also be mentioned that many of the encryption schemes already discussed in the literature are in fact group homomorphic schemes (RSA, ElGamal, Paillier, Goldwasser-Micali, Benaloh, etc.), but one can easily produce other schemes where the spaces have only a monoid structure or even a semigroup structure.

Practical encryption schemes require additional constraints on the algorithms KeyGen, Enc and Dec such that the encryption and decryption processes are feasible, secure and efficient. For a Struc-homomorphic encryption scheme, the algorithms that compute the structure on both plaintext and ciphertext spaces also need to be efficient. The additional structure on the plaintext and ciphertext spaces is needed in order to perform computations on encrypted data.

Definition 2: A Struc homomorphic encryption scheme (G, H, Enc, Dec) is called a leveled Struc homomorphic encryption scheme if the decryption algorithm is correct only for a certain number of Struc operations made on G.

All of the proposed secure ring homomorphic encryption schemes are "error"-based schemes which make them leveled for practical purposes. Even if the scheme is bootstrapable (see [vDGHV]), the practical implementation of any previously existing ring homomorphic scheme is leveled (such as HeLib), because the construction of a fully homomorphic encryption scheme out of a bootstrapable one is a limiting process.

It should be recalled that the notion of a fully homomorphic encryption scheme (for example, as discussed in [vDGHV]) is equivalent to the ring homomorphic encryption scheme, where the plaintext space is the field with two elements $F_2$. Indeed, this is due to the fact that any boolean circuit with XOR and AND gates can be written as a polynomial over $F_2$ with the XOR and AND gates replaced by addition and multiplication (for more details, see [Ge11]).

II. Monoid Algebras

It will be useful to recall how one can associate to any monoid and any commutative ring with unity a ring called monoid algebra. Let (M, •) be a monoid and let R be a commutative ring with unity. As an R-module, the monoid algebra R[M] is free with a basis consisting of the symbols [x], x∈M, and the multiplication on R[M] is defined by the R-bilinear extension of [x]·[y]=[xy]. Therefore, every element of a∈R[M] has a unique representation $$a = \Sigma_{x \in m} a_x[x] \quad (1f),$$

in which $a_x=0$ for all but finitely many x∈M, and the product of a, b∈R[M] is given by $$ab = \Sigma_{x \in m} \Sigma_{yz=x} a_y b_z [x]. \quad (2f)$$

The identity element of R[M] with respect to multiplication is 1[e] where e is the identity element of M. If M is a group, then the monoid algebra above is called group algebra. Notice that the R-algebra R[M] is commutative if and only if M is commutative.

Remark 3: If M is the free monoid in one generator, then R[M] is isomorphic to R[X] as R-algebras, whereas if G is the free group in one generator, then R[G] is isomorphic to R[X, 1/X] as R-algebras.

An R-character of a monoid M is a monoid homomorphism $\chi$: M→A from M to the multiplicative monoid of an R-algebra A, i.e. $\chi(xy)=\chi(x)\chi(y)$, for all x, y∈M, and $\chi(e)=1$. The monoid algebra R[M] is characterized up to isomorphism by the following universality property: for every R-character $\chi$: M→A, there exists a unique R-algebra homomorphism R[M]→A extending $\chi$. If we also denote by $\chi$ the extension R[M]→A then:

$$\chi(\Sigma a_x[x]) = \Sigma a_x \chi(x). \quad (3f)$$

Let M, M' be monoids, and $\varphi$: M→M' a monoid homomorphism. Then $\varphi$ induces an R-algebra homomorphism $\varphi_R$:

$$R[M] \to R[M']$$

via $$\varphi_R(\Sigma a_x[x]) = \Sigma a_x[\varphi(x)]. \quad (4f)$$

Notice that formula (4f) defines $p_R$ as the R-linear extension of cp. For any R-algebra A, there is a natural R-algebra homomorphism ε:

$$R[A] \to A$$

given by $$\varepsilon(\Sigma r_x[x]) = \Sigma r_x x. \quad (5f)$$

III. Blueprint

Let R be a ring and let (G, H, E, D) be a monoid homomorphic encryption scheme. Consider also an R-character $\chi$: H→A and let M be the monoid algebra R[G]. As explained above, the monoid homomorphism D: G→H induces the R-algebra homomorphism $D_R$: R[G]→R[H]. At the same time, the R-character $\chi$ induces the R-algebra homomorphism $\chi_R$: R[H]→R[A]. The R-algebra homomorphism Dec is defined as the composition Dec=ε°$\chi_R$°$D_R$: R[G]→R[H]→R[A]→A. It is straightforward to check that Dec satisfies or is defined by the following formula: Dec $(\Sigma_{g \in G} a_g [g]) = \Sigma_{g \in G} a_g \chi(D(g))$. Because the proposed encryption scheme is based on the monoid algebra R[G] as described herein, the decryption algorithm can be applied homologically with respect to multiplication and/or addition operations applied to the encrypted message.

Let S denote the image of $\chi$ in A. For Dec to remain secure, one needs the assumption that $|S| \geq 2$, i.e. $\chi$ is not the trivial character, a condition always assumed in the inventive blueprint. We shall suppose that the pair (A, S) satisfies the following condition: there exist a k-tuple $(r_1, \ldots, r_k) \in R^k$, where $k \geq 1$, such that the set containing the elements of the form $\Sigma\, r_i\, s_i$ with $s_i \in S$, $\forall i$ (not necessarily distinct) is the whole R-algebra A. A necessary condition for the existence of such a tuple is that A is generated as an R-module by S. If this is not the case, then A may be replaced by its R-submodule generated by S. Indeed, since S is closed under multiplication, the R-submodule of A generated by S is an R-subalgebra of A.

This necessary condition is not sufficient to ensure the existence of a tuple as above. However, if S contains 0, the two conditions are equivalent because A is a finite ring. The ring homomorphic encryption scheme (M, A, Enc, Dec) will now be described as follows:

1. Enc: Let S be the image of $\chi$ in A and consider a fixed tuple $(r_1, \ldots, r_k) \in R^k$, where $k \geq 1$, such that the set containing the elements of the form $\Sigma\, r_i\, s_i$ with $s_i \in S$ is the whole R-algebra A. For a plaintext $m \in A$, consider $(h_1, \ldots, h_k) \in H^k$ such that $m = \Sigma\, r_i\, \chi(h_i)$. Then $\text{Enc}(m) = \Sigma\, r_i\, [E(h_i)]$.

2. Dec: The decryption algorithm is given by:

$$Dec(\Sigma_{g \in G} a_g [g]) = \Sigma_{g \in G} a_g \chi(D(g)).$$

The encryption scheme (M, A, Enc, Dec) is a ring homomorphic encryption scheme.

As seen above, given the homomorphic properties of D and $\chi$, one gets that Dec is actually a ring homomorphism. The security of the scheme is the same as the security of the monoid encryption scheme (G, H, E, D) since no information and no additional security was revealed or added through the steps describing the encryption algorithm. The choice of the generating set $(r_1, \ldots, r_k)$ described in Enc ensures the privacy of the encryption scheme in the sense that any plaintext has the same probability of being encrypted. One should make the difference (as discussed further below) between the probability of plaintexts generated by choosing random elements in S and producing the plaintext $\Sigma\, r_i\, s_i$, and the probability of a certain plaintext to be encrypted. In essence, the choice of the set $(r_1, \ldots, r_k)$ ensures that no plaintext is left outside the encryption process. The bigger the set S is inside A, the smaller the number k can be chosen.

The efficiency of a typical encryption scheme is k times less than the efficiency of the inventive monoid homomorphic encryption scheme since the length of the ciphertext obtained by Enc is approximately k times the length of a ciphertext obtained by E. In particular, the encryption algorithm has size polynomial in the security parameter and the output has length polynomial in the same parameter if and only if the monoid homomorphic encryption scheme has the same property. The decryption algorithm Dec has also the same efficiency as the algorithm D in the monoid homomorphic encryption scheme.

Having fixed the encryption scheme, the length of the ciphertexts obtained by performing algebraic computations is finite since all computations take place in M, which is a finite ring. In other words, all of the algebraic properties as well as the properties required in the privacy, efficiency and security problems are satisfied by the ring homomorphic encryption scheme constructed above if one starts with an efficient, private and secure monoid homomorphic encryption scheme.

In general, the plaintext space P need not be the whole R-algebra A, but just a subring of it. Therefore, one can encrypt only the desired plaintexts and still obtain the desired degree of efficiency. This feature will be illustrated in the Example below. Moreover, the blueprint works in the more general case of non-commutative setting (noncommutative monoids and algebras).

Example

The follow discussion illustrates a FHE scheme based on the above blueprint. Hereafter, the ring R is the field $F_2$. If (G, H, E, D) is a group homomorphic encryption scheme, since H is a group, the image of any character $\chi \colon H \to A$ is also a group, so that if $A = F_2$, then any character is trivial. This is the reason to consider an $F_2$-algebra A different from $F_2$ itself, and a group homomorphic encryption scheme (G, H, E, D) such that there exists a nontrivial $F_2$-character $\chi \colon H \to A$ (in particular $\gcd(|H|, |A^x|) > 1$). The simplest (but not the most efficient) example of such a situation is the following variant of Benaloh's cryptosystem (cf. [Be94]), which is an extension of the Goldwasser-Micali cryptosystem (cf. [GM]).

An explicit description of the group homomorphic encryption scheme will now be described. Choose two large primes p, q such that $p \equiv 1 \pmod{3}$, $p \not\equiv 1 \pmod 9$, $q \equiv 1 \pmod 3$, and let $N = p \cdot q$. Let $G := (Z/NZ)x$ be the group of invertible elements mod N, and let $\pi_p \colon (Z/NZ)^x \to (Z/pZ)^x$ and $\pi_q \colon (Z/NZ)^x \to (Z/qZ)^x$ be the projection maps. Fix two primitive third roots of unity: $\omega_p \in (Z/pZ)x$ and $\omega_q \in (Z/qZ)x$, i.e. let $\omega_p = g_p^{(p-1)/3}$, where $g_p$ is a generator of the cyclic group $(Z/pZ)x$, and similarly for $\omega_q$.

Let $\varphi \colon (Z/pZ)x \to Z/3Z$ be the group homomorphism defined by: $\varphi(x) = i$ if and only if $x^{(p-1)/3} = \omega_p^{i(p-1)/3}$. The morphism $\varphi$ is efficiently computable because raising x to the power $(p-1)/3$ can be done in log p steps. By Fermat's Little Theorem, $x^{(p-1)/3}$ is a third root of unity modulo p, therefore $x^{(p-1)/3} \in \{1, \omega, \omega^2\}$, so that $\varphi$ is well defined if and only if $p \not\equiv 1 \pmod 9$.

For encryption, let $\eta$ be the unique element of G, such that $\pi_p(\eta) = \omega_p$ and $\pi_q(\eta) = \omega_q$. The group homomorphic encryption scheme (G, Z/3Z, E, D) is given as follows:

1. Setup $(1^\lambda)$: Choose two large enough primes (to ensure semantic security) $p = p(\lambda)$, $q = q(\lambda)$ such that $p \equiv 1 \pmod 3$, $p \not\equiv 1 \pmod 9$, and $q \equiv 1 \pmod 3$.

2. PublicKeygen: Set $N = pq$. Fix a primitive third root of unity modulo p, say $\omega_p$, and a primitive third root of unity modulo q, say, $\omega_q$. Such a choice does not necessarily make use of the generators $g_p$ and $g_q$. Let $\eta \in G$ be such that: $\pi_p(\eta) = \omega_p$ and $\pi_q(\eta) = \omega_q$. The public key is the pair $(N, \eta)$.

3. SecretKeygen: The secret key is the prime p.

4. E: To encrypt $m \in Z/3Z$, choose a random $y \in G$ and let $E(m) = \eta^m y^3$.

5. D: The decryption of $c \in G$ is given by $D(c) = \varphi(\pi_p(c))$.

To describe the associated FHE scheme, let $\mu_3 = \{1, \omega, \omega^2\}$ be the group of third roots of unity of $\overline{F_2}$ (the algebraic closure of $F_2$). The field with four elements will then consist of $F_4 = \{0, 1, \omega, \omega^2\}$ (here $\omega$ satisfies the equation $\omega^2 + \omega + 1 = 0$). Let $A = F_4$ and let the character $\chi \colon Z/3Z \to F_4$ be defined by $m \to \omega^m$. Notice that $\chi \colon Z/3Z \to F_4^x$ is an isomorphism of groups so that we shall denote by $\chi^{-1}$ its inverse. Now the encryption and decryption algorithms of the FHE scheme are given by:

Enc: To encrypt the bit $m = 0$, encode w twice using the above scheme to get $E_1(\chi^{-1}(\omega))$, $E_2(\chi^{-1}(\omega))$ and then set $\text{Enc}(0) = [E_1(\chi^{-1}(\omega))] + [E_2(\chi^{-1}(\omega))]$.

For $m = 1$, let $E_1(\chi^{-1}(\omega))$ and $E_2(\chi^{-1}(\omega^2))$ be encryptions of $\omega$ and $\omega^2$ respectively, and set $\text{Enc}(1) = [E_1(\chi^{-1}(\omega))] + [E_2(\chi^{-1}(\omega^2))]$.

Dec: For $c=\Sigma_{g\in G}\, r_g\, [g]\in F_2[G]$, let $Dec(c)=E_{g\in G}\, r_g\, \chi(D(g))$. One sees easily that the homomorphic properties and the security of the scheme are as described in the blueprint.

One can avoid the extra condition $p\not\equiv 1 \pmod 9$, respectively the rather unnatural definition of $\varphi$, by choosing $\eta$ to be a lifting of a fixed generator $g_p$ of $(Z/pZ)x$. This particular example deliberately did not make use of knowledge of such a generator.

The inventive monoid homomorphic encryption has another interesting feature. It detects with high probability if the message sent for encryption has been altered during the transmission. Specifically, for every bit encrypted as $[g_1]+[g_2]$, if one changes randomly the elements $g_1$ and $g_2$, there is a ½ probability that the altered ciphertext does not decrypt to 0 or 1 (but rather to $\omega$ or $\omega^2$). For a large text that has been tampered with during the encryption, the probability of detecting if the message has been altered or not is very high. This feature is very useful in many applications, and is not provided by any the "error"-based encryptions.

The monoid homomorphic encryption scheme will now be described. Let G be the set $(F_2)^n$, with the monoid structure defined by componentwise multiplication. Basically, G is the commutative monoid generated by n idempotents with no "extra" relations. The scheme is defined as follows:

Setup ($1^\lambda$): Choose the dimension parameter $n=n(\lambda)$, and the integers $d=d(\lambda)\leq s=s(\lambda)$ to be defined as follows: Use the Simplex algorithm to solve the following problem: set $P(k, u, v):=\text{Binomial}(v-k, u-k)/\text{Binomial}(v, u)$. Fix $\varepsilon$ an acceptable statistical error (of size of order 1/(dimension of the document in clear or to be encrypted)). Fix $X=(X(1), \ldots, X(d))$ a random variable with probabilities to be determined by the simplex algorithm. For each $r=1, \ldots, \sqrt{2d}$ and each $i=1, \ldots, r$, set the expression $$E(X,i,r,s,d,n):=\Sigma_{k=1}^d X(k)(P(i,k,s)P(r-i,d-k,n-s)-P(r,d-k,n-s)),$$

where $P(k, u, v)$ is set to be 0 if $k>\text{Min}(u, v)$. The system of approximate equations to be solved takes the form:

$$\left|E(X, i, r, s, d, n) - \frac{1}{2}P(r, d, n-s)\right| < \epsilon,$$

for all i, r in the given range, $X(k)\geq 0$ for all k and $$\sum_{k=1}^d X(k) = \frac{1}{2}.$$

SecretKeygen: Choose a subset Sk of $\{1, 2, \ldots, n\}$ of size s. Set the secret key to be Sk.

E: To encrypt $1\in F_2$, choose d random numbers $i_1, i_2, \ldots, i_d$ from the set $\{1, 2, \ldots, n\}$ such that none of them is in the secret key set Sk. Set E(1) to be the vector of length n with zeroes on the chosen positions and 1 everywhere else. To encrypt $0\in F_2$, choose k in $\{1, \ldots, d\}$ with probability 2 X(k). Choose k random positions in Sk and d-k random positions outside Sk and set E(0) to be the vector of length n with zeroes on the chosen positions and 1 everywhere else.

D: To decrypt a ciphertext c using the secret key Sk, set $D(c)=0$ if c has at least one component equal to 0 corresponding to an index from Sk. Otherwise, $D(c)=1$.

It is straightforward to verify that $D(c_1\cdot c_2)=D(c_1)\cdot D(c_2)$, so that the above scheme is a monoid homomorphic encryption scheme.

The security of the scheme under brute-force attack will now be discussed. To achieve $2^\lambda$ security against brute-force attacks, it will be necessary for the parameters n, d, s to satisfy the following conditions: s, $d=\Theta(\lambda)$, and $n=\Theta(\lambda^2)$. Using brute-force attack, an adversary needs to try Binomial [n, s] subsets of $\{1, 2, \ldots, n\}$ in order to find the secret key Sk. Since by Stirling's formula Binomial[n, s]=$2^{\omega(\lambda\, log\, \lambda)}$, the required security is obtained. Therefore a brute force attack has a chance of less than $2^{-\lambda}$ to be successful, thereby making the scheme secure for this type of attack.

A more skillful adversary that has access to an encrypted text can try to attack by computing the statistics of occurrences of 0 on ciphertexts. This type of computation will reveal no significant information if the statistic of r-tuple occurrences of zero is uniform up to the acceptable error $\in$ for each r (a random variable is determined by its moments). But the setup provides that up to a high enough moment, the statistic is uniform within an acceptable error.

In fact, in practice, the above scheme is far more efficient than the mathematical prediction since in practice one works only within a fixed range of values for the security parameter, etc. The above simplex algorithm was run where the acceptable statistical error was fixed as $\varepsilon=2^{-30}$ and found an acceptable range of solutions for (d, s, n)=(22, 31, 1010). The solution is found almost instantaneously on a regular PC. For example, the algorithm found it in 0.17 sec using a 2.66 GHz 17 PC equipped with 8 Gb RAM. In fact, the solution will ensure that no r-tuple statistics will reveal significant information because already at the $6^{th}$ moment (which is guarantied by the simplex algorithm to reveal no information), the probability of encryption with a fixed 6-tuple is less than $\varepsilon$. The brute force attack is also impossible since Binomial[1010, 31] is of order $2^{196}$, which is far beyond today's (or near future) capacity of processing. Therefore, for documents of size of Gb-order, the inventive encryption is proved to be secure and sufficiently efficient.

In order to make the encryption even more secure (or more efficient for the same security level), the size of the secret key is not made public (and not deducible from the encryption algorithm), and a probabilistic attack is avoided by encrypting each position i with a certain probability $p_i$. The secret key now consists of the set Sk which will be identified with a vector $v\in G$, which has 0 on the positions corresponding to Sk and 1 on the other positions, a probability vector $X=(X(1), \ldots, X(d))$ and of a set of probabilities $p_k(p_{1,k}, \ldots, p_{n,k})$ with the constraints $\Sigma\, p_{i,k}\, Sk[i]=1$ and $\Sigma\, p_{i,k}\, (1-Sk[i])=1$ for each $k=1, \ldots, d$. Each time one encrypts 0, one chooses k according to X and k positions from Sk are drawn according to their probabilities. While completing the ciphertext, the probability vector is used to draw the rest of (d-k) zeroes. A similar procedure is conducted for the encryption of 1, only that now we draw only 1 on the positions corresponding to Sk, according to a vector of probabilities $p_k=(p_{i,0})_{i\notin Sk}$.

The probability vector is input with numbers, which makes a probabilistic attack indistinguishable, i.e. the relative frequencies $f_i$ corresponding to Sk are distributed uniformly within the vector of all relative frequencies. The computations corresponding to the first moment (or 1-point statistics) will now be presented, and the general case can be treated similarly.

Let $M=(M_1, \ldots, M_m)$ be an ordered set of natural numbers. Define the $C_j(M)$ by $P_M(X):=\Pi(1+M_i X)=\Sigma_j C_j(M) X^j$. For $1\leq i\leq |M|$, let $M^i$ be the set obtained from M by deleting the $i^{th}$ number and $M:=\Sigma_i M_i$. Let also $N_i:=M_1+\ldots+M_i$ for all $1\leq i\leq m$ and $N_0:=0$. To chose a tuple of length k with probabilities $p_i=M_i/M$, choose Random$((x_1, \ldots, x_k), [1, M])$ such that no two extractions are within the same interval $(N_{i-1}, N_i)$. Output the indices i for which there exist $x \in \{x_1, \ldots, x_k\}$ with $x \in (N_{i-1}, N_i]$. The probability for an index i to appear in a k-tuple extraction is given by $M_i C_{k-1}(M^i)/C_k(M)$. It is assumed that one can draw uniformly a k-tuple with different indices i. This can be done with the function Random$((x_1, \ldots, x_k), [1, M])$.

The encryption algorithm runs as follows. Let $A = (A_1, \ldots, A_{n-s})$ be a finite ordered set of natural numbers corresponding to the positions outside Sk and $B = (B_1, \ldots, B_s)$ for the positions in Sk. For E(0): choose $1 \leq k \leq d$ according to the probability vector X, then choose a k-tuple in Sk and a (d−k)-tuple outside Sk as in the above procedure. Output the vector which has 0 on the chosen positions and 1 everywhere else. For E(1): Choose a d-tuple outside Sk according to the above procedure. Output the vector which has 0 on the chosen positions and 1 everywhere else.

The frequency $f_i$ of appearance of 0 on the $i^{th}$ position is given by:

$$\frac{1}{2}\sum_{k=1}^{d} X(k) * B_i \frac{C_{k-1}(B^i)}{C_k(B)}, \text{ if } i \in Sk$$

$$\frac{1}{2} A_i \frac{C_{d-1}(A^i)}{C_d(A)} + \frac{1}{2}\sum_{k=1}^{d-1} X(k) * A_i \frac{C_{d-k-1}(A^i)}{C_{d-k}(A)}, \text{ if } i \notin Sk$$

If one simply uses successive drawing with rejection (instead of random drawing), then the associated probability that an index i appears in a k-tuple relative to a vector $M = (M_1, \ldots, M_m)$ is:

$$Q_i(k, M) := \sum_{t=0}^{k-1} \sum_{(j_1, \ldots, j_t)} \left( \prod_{v=1}^{t} \frac{M_{j_v}}{M - M_{j_1} - \ldots - M_{j_{v-1}}} \right) \frac{M_i}{M - M_{j_1} - \ldots - M_{j_t}},$$

with the convention that $M_{j_0} = 0$ and the sum is taken over all ordered k-tuples which do not contain i. In this case, the associated frequency is:

$$\frac{1}{2} \sum_{k=1}^{d} X(k) Q_i(k, B),$$

if $i \in Sk$ $$\frac{1}{2} Q_i(d, A), + \frac{1}{2} \sum_{k=1}^{d-1} X(k) * Q_i(d-k, A),, \text{ if } i \notin Sk$$

To ensure security against statistical attack, then one has to be sure that the vector $(f_1, \ldots, f_n)$ has no particularities that reveal information about the secret key Sk. In order to properly define this, a vector (set) of real numbers is defined:

Definition 4: A vector (set) of real numbers is said to be (m, δ) clustered if any element has at least m neighbors within a δ-distance.

In the present instance, if δ is small (say of order $\lambda^{-5}$), then one cannot statistically distinguish between the m close points in any meaningful sense. Therefore, it is enough to achieve the vector of frequencies to be (m, δ) clustered. This can be done because the frequencies $f_i$ are continuous functions with respect to the vector of probabilities $(p_{i,k})$. One chooses $M_i$ clustered, computes the corresponding frequencies, and attaches the probabilities within the zero locus of the secret key so the relative frequencies remain clustered.

The analysis of security in this setup shows that in order to achieve $2^\lambda$ security against brute-force attacks, it is only necessary that $n = O(\lambda)$.

The FHE schemes corresponding to the above encryption realize the highest efficiency. This is due to the fact that one can take k=1 in the blueprint. In particular, multiplying fresh ciphertexts does not increase the length of the resulting ciphertext. This being said, the FHE scheme can efficiently evaluate any circuit, which has additive depth polynomial in the security parameter λ. It should be noticed that, in fact, any practical circuit is of this type. Consequently, the present invention provides a high degree of security required for commercial transactions such as but not limited to electronic commerce.

IV. Figures

The invention will now be described with reference to the Figures. Numerals in parentheses [such as "(11)"] or indicators in parentheses [such as "(step 21)"] in the discussion below are figure reference numerals which refer to corresponding elements in the respective figures.

Figure 1:
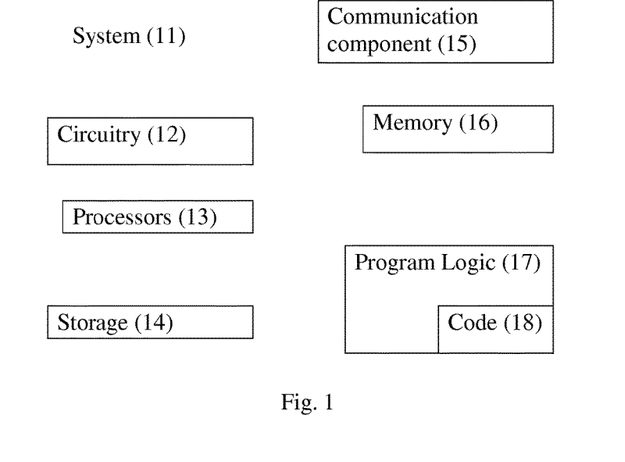
FIG. 1 shows an exemplary embodiment of a computer system in which certain embodiments of the invention may be implemented.

FIG. 1 shows an embodiment of a computer system (11) which implements the invention. The system (11) contains components such a processor (13), memory (16), storage (14), a communication component (15), circuitry (12) such as a data bus, and program logic (17) and computer code (18) for the functioning of the invention.

The system (11) may be a conventional mainframe, microcomputer, desktop, laptop, or tablet computer which is configured and pre-loaded with the required computer logic including computer code or software, or it may be a custom-designed computer. The computer system (11) may be a single computer which performs the steps of the invention, or it may comprise a plurality of computers, such as a server/client. In certain embodiments, a plurality of clients can be connected to one or more servers. The computer system (11) may also be networked with other computers over a local area network (LAN) connection or via an Internet connection. The system may also comprise a backup system which retains or stores a copy of the data obtained by or used by the invention. Any computer systems (11) involved in the performance of the invention may each have their own processors (13), computer storage (14), memory (16), and program logic (17) and code (18). A computer may have multiple processors, or a processor may have multiple cores, caches, or other features as are known in the art.

Examples of computer storage (14) include conventional storage devices such as hard drives such solid state drives or drives having spinning platters. Storage (14) may be volatile or non-volatile, or both in particular embodiments, and it may be magnetic, optical, or use other data storage technologies. Data used by the system may be stored in a single location, for example, an associated hard drive, or the data may be stored or generated over a plurality of computer systems. For example, one system may contain or generate data such as an encryption key, another system may contain stored or generated data to be encrypted by the invention, and a separate system may be equipped to store or generate the transformed data or to maintain a record of transactions performed by the invention.

Memory (16) used by the invention may include volatile or nonvolatile memory such as RAM or ROM. The system components are interconnected using electronic circuitry (12) to so that they may communicate and exchange data and information.

The system (11) also comprises a communication component (15) to enable the system and user to exchange data, or to allow the system to exchange data with another computer. The communication component (15) may be a programmable printed circuit board, microcontroller, or other device which receives incoming data signals, and which transmits data to an outside system. There may be any number of communications components (15), and they may also include input devices such as a keyboard or mouse to enable a user to interact with the system. To communicate over a network such as a LAN, VPN, or the Internet, the communications component (15) may comprise a modem, digital/analog converter, or other device which allows electronic signals or data to be exchanged with another computer such as a peer, client, or server. The system may also be equipped with a display (not illustrated) to allow a user to view information.

The components of the system may be conventional, although the system will generally be custom-configured for each particular implementation. The computer system (11) may run on any particular architecture, for example, personal/microcomputer, minicomputer, or mainframe systems. Operating systems may include Apple OSX and iOS, Microsoft Windows, and UNIX/Linux; SPARC, POWER and Itanium-based systems; and z/Architecture.

The computer program logic (17) and associated code (18) to perform the invention may be written in any programming language, such as but not limited to C/C++, Objective-C, Java, Basic/VisualBasic, or assembler. The code (18) may also be written in a proprietary computer language which is specific to a particular manufacturer or a particular computer hardware component used in conjunction with the invention. The runtime, installation files, or other computer code of the present invention may also be sold commercially or be sold pre-installed on or in a circuit board, microcontroller, memory, storage, or other computer hardware component. The invention can also be implemented in hardware, such as a computer chip or board on which the computer instructions are embedded during manufacture. Alternatively, the program logic (17) and code (18) can be obtained via download or purchase over the Internet or a local area network. The computer program logic and code is installed in a non-volatile and non-transitory manner on a storage device known in the art, such as but not limited to a hard drive, magnetic drive, optical drive, tape drive, or the like.

Although exemplary embodiments presented herein may be illustrated or discussed by reference to particular computer storage media, it should be understood that any kind of non-transitory or non-volatile computer storage media can be used, such as magnetic cassettes, flash memory cards, random access memory, and read-only memory.

Figure 2:
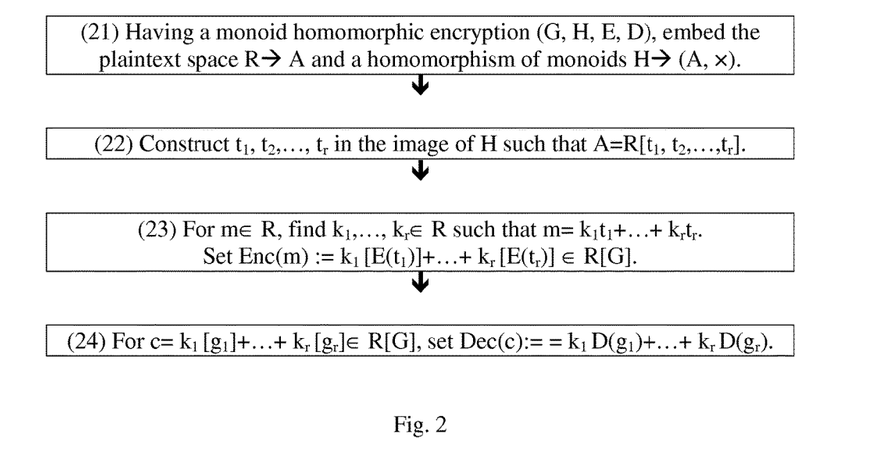
FIG. 2 shows a general method to construct fully homomorphic encryption schemes starting with a monoid homomorphic encryption scheme in accordance with the present invention.

FIG. 2 shows a general method to construct homomorphic encryption schemes starting with a monoid homomorphic encryption scheme. The method involves the following steps:

1. Having a monoid homomorphic encryption (G, H, E, D), embed the plaintext space R→A and a homomorphism of monoids H→(A, x) (step 21).
2. Construct $t_1, t_2, \ldots, t_r$ in the image of H such that $A = R[t_1, t_2, \ldots, t_r]$ (step 22).
3. For $m \in R$, find $k_1, \ldots, k_r \in R$ such that $m = k_1 t_1 + \ldots + k_r t_r$ (step 23).
4. Set $\text{Enc}(m) := k_1 [E(t_1)] + \ldots + k_r [E(t_r)] \in R[G]$ (step 23).
5. For $c = k_1 [g_1] + \ldots + k_r [g_r] \in R[G]$, set $\text{Dec}(c) := k_1 D(g_1) + \ldots + k_r D(g_r)$ (step 24).

Figure 3:
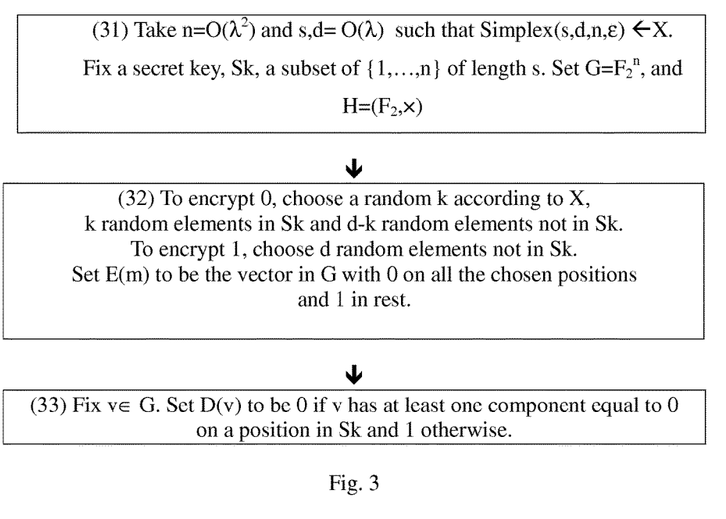
FIG. 3 shows an example of a monoid homomorphic encryption scheme which provides high efficiency using the inventive method.

FIG. 3 shows an example of a monoid homomorphic encryption scheme which provides high efficiency using the inventive method. The method involves the following steps:

1. Take $n = O(\lambda^2)$ and s, $d = O(\lambda)$ such that Simplex(s, d, n, ε)←X. Fix a secret key, Sk, a subset of $\{1, \ldots, n\}$ of length s. Set $G = F_2^n$, and $H = (F_2, x)$ (step 31).
2. To encrypt 0, choose a random k according to X, k random elements in Sk and d−k random elements not in Sk. To encrypt 1, choose d random elements not in Sk (step 32).
3. Set E(m) to be the vector in G with 0 on all the chosen positions and 1 in the remaining positions (step 32).
4. Fix $v \in G$. Set D(v) to be 0 if v has at least one component equal to 0 on a position in Sk. Otherwise, set D(v) to be 1 (step 33).

Figure 4:
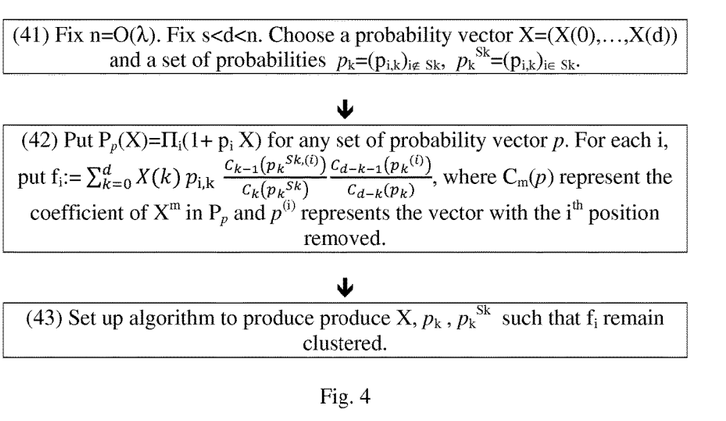
FIG. 4 shows a method in accordance with an aspect of the present invention for producing clustered relative frequencies, which reveal no information about the secret key, using an algorithm that is able to generate random tuples with distinct values from a selected alphabet.

FIG. 4 shows a method to produce clustered relative frequencies, which reveal no information about the secret key, using an algorithm that is able to generate random tuples with distinct values from a selected alphabet. The method involves the following steps:

1. Fix $n = O(X)$. Fix $s < d < n$. Choose a probability vector $X = (X(0), \ldots, X(d))$ and a set of probabilities $p_k = (p_{i,k})_{i \notin Sk}$, $p_k^{sk}(p_{i,k})_{i \in Sk}$ (step 41).
2. Put $p_p(X) = \Pi_i(1 + p_i X)$ for any set of probability vector p (step 42).
3. For each i, put $$f_i := \sum_{k=0}^{d} X(k) p_{i,k} \frac{C_{k-1}(p_k^{Sk,(i)})}{C_k(p_k^{Sk})} \frac{C_{d-k-1}(p_k^{(i)})}{C_{d-k}(p_k)},$$

where $C_m(p)$ represent the coefficient of $X^m$ in $P_p$ and $p^{(i)}$ represents the vector with the $i^{th}$ position removed (step 42).
4. Run algorithm to produce X, $p_k$, $p_k^{Sk}$ such that $f_u$ is in some clustered subset of the vector $[f_i, i \in [1, n]]$ (step 43).

Figure 5:
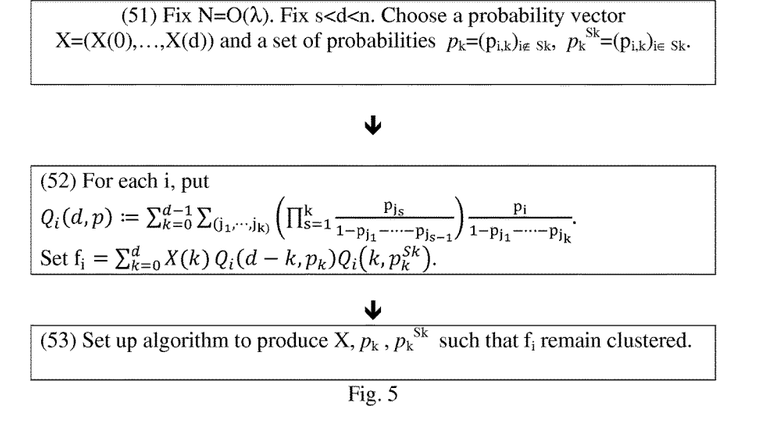
FIG. 5 shows a method in accordance with the present invention for producing clustered relative frequencies, which reveal no information about the secret key using repeated random draws with rejections.

FIG. 5 shows a method to produce clustered relative frequencies which reveal no information about the secret key using repeated random draws with rejections. The method involves the following steps:

1. Fix $n = O(X)$. Fix $d < s < n$. Choose a probability vector $X = (X(0), \ldots, X(d))$ and a set of probabilities $p_k = (p_{i,k})_{i \notin Sk}$, $p_k^{Sk} = (P_{i,k})_{i \notin Sk}$ (step 51).
2. For each i, put $$Q_i(d, p) := \sum_{k=0}^{d-1} \sum_{(j_1, \ldots, j_k)} \left( \prod_{s=1}^{k} \frac{p_{j_s}}{1 - p_{j_1} - \ldots - p_{j_{s-1}}} \right) \frac{p_i}{1 - p_{j_1} - \ldots - p_{j_k}}.$$

(step 52)

Set (step 52)

$$f_i = \sum_{k=0}^{d} X(k) Q_i(d-k, p_k) Q_i(k, p_k^{sk}).$$

4. Run algorithm to produce X, $p_k$, $p_k^{sk}$ such such that $f_u$ is in some clustered subset of the vector $[f_i, i \in [1, n]]$ (step 53).

Figure 6:
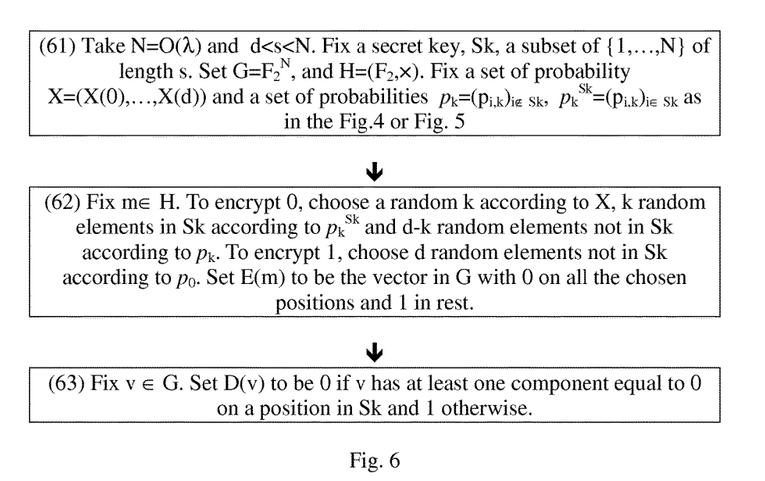
FIG. 6 shows an example of monoid homomorphic encryption scheme which uses probabilistic encryption in accordance with an aspect of the present invention.

FIG. 6 shows an example of a monoid homomorphic encryption scheme which uses probabilistic encryption. The method involves the following steps:

1. Take $n=O(X)$ and s, d<n. Fix a secret key, Sk, a subset of $\{1, \ldots, n\}$ of length s. Set $G=F_2^n$, and $H=(F_2, x)$. Fix a probability vector $X=(X(1), \ldots, X(d))$ and of a set of probabilities $p_k=(p_{i,k})_{i \in Sk}$, $d \geq k \geq 0$ $p_k^{Sk}=(p_{i,k})_{i \in Sk}$ $d \geq k \geq 1$ as in FIG. 4 or 5 (step 61).
2. To encrypt 0, choose a random k according to X, k random elements in Sk according to $p_k^{Sk}$ and d–k random elements not in Sk according to $p_k$. To encrypt 1, choose d random elements not in Sk according to $p_0$ (step 62).
3. Set E(m) to be the vector in G with 0 on all the chosen positions and 1 in the remaining positions (step 62).
4. Fix $v \in G$. Set D(v) to be 0 if v has at least one component equal to 0 on a position in Sk. Otherwise, set D(v) to be 1 (step 63).

Other objects, advantages and embodiments of the various aspects of the present invention will be apparent to those who are skilled in the field of the invention and are within the scope of the description and the accompanying figure. For example, but without limitation, structural or functional elements might be rearranged, or method steps reordered, consistent with the present invention. A person of skill in the relevant art will understand that the principles according to the present invention, and methods and systems that embody them, could be applied to other examples and configurations, which, even if not specifically described here in detail, would nevertheless be within the scope of the present invention.

V. References

[AK13] F. Armknecht, S. Katzenbeisser, A. Peter; Group Homomorphic Encryption: Characterizations, Impossibility Results, and Applications, in Designs, Codes and Cryptography, vol. 67, no. 2, 2013, pp. 209-232.

[BPCat] M. Barcau, V. Pasol; The Category of Fully Homomorphic Encryption Schemes, work in progress.

[BSJR] M. Bellare, A. Desai, E. Jokipii, P. Rogaway; A concrete security treatment of symmetric encryption, in Proceedings of the 38th Symposium on Foundations on Computer Science, IEEE, 1997, pp. 394-403.

[Be94] J. Benaloh; Dense Probabilistic Encryption, in Proceedings of the Workshop on Selected Areas of Cryptography, 1994, pp. 120-128.

[BV11] Z. Brakerski, V. Vaikuntanathan; Efficient fully homomorphic encryption from (standard) LWE, R. Ostrovsky editor, IEEE 52nd Annual Symposium on Foundations of Computer Science, FOCS 2011, Palm Springs 2011, pp. 97-106.

[Br12] Z. Brakerski; Fully homomorphic encryption without modulus switching from classical GapSVP, in CRYPTO 2012, pp. 868-886.

[BGV12] Z. Brakerski, C. Gentry, V. Vaikuntanathan; Fully homomorphic encryption without bootstrapping, in Innovations in Theoretical Computer Science (ITCS '12), 2012, Available at http://eprint.iacr.org/2011/277.

[CMNT] J.-S. Coron, A. Mandal, D. Naccache, M. Tibouchi; Fully homomorphic encryption over the integers with shorter public keys, P. Rogaway editor, Advances in Cryptology—CRYPTO 2011-31st Annual Cryptology Conference, Santa Barbara 2011, Lecture Notes in Computer Science, volume 6841, Springer, 2011, pp. 487-504.

[vDGHV] M. van Dijk, C. Gentry, S. Halevi, V. Vaikuntanathan; Fully hohomomorphic encryption over the integers, In EUROCRYPT, 2010, pp. 24-43.

[DM15] L. Ducas, D. Micciancio; FHEW: Homomorphic Encryption Bootstrapping in less than a second, Advances in Cryptology—EUROCRYPT 2015, Lecture Notes in Computer Science, Vol. 9056, pp. 617-640, 2015.

[FK94] M. Fellows, N. Koblitz; Combinatorial cryptosystems galore!, in Finite Fields: Theory, Applications, and Algorithms, vol. 168 of Contemporary Mathematics, A M S 1994, pp. 51-61.

[GeTh09] C. Gentry; A fully homomorphic encryption scheme, PhD thesis, Stanford University, 2009.

[Ge09] C. Gentry; Fully homomorphic encryption using ideal lattices, in STOC '09, pp. 169-178.

[Ge10] C. Gentry; Computing arbitrary functions of encrypted data, Communications of the ACM, Volume 53 Issue 3, March 2010, pp. 97-105.

[Ge11] U.S. Pat. No. 8,630,422; Fully homomorphic encryption method based on a bootstrappable encryption scheme, computer program and apparatus; Craig B. Gentry, Assigned to International Business Machines Corporation

[GH11] C. Gentry, S. Halevi; Implementing Gentry's Fully-Homomorphic Encryption Scheme, Advances in Cryptology—Proceedings of EUROCRYPT 2011, Lecture Notes in Computer Science, Vol. 6632, Springer, pp. 129-148, 2011

[GSW13] C. Gentry, A. Sahai, B. Waters; Homomorphic Encryption from Learning with Errors: Conceptually-Simpler, Asymptotically-Faster, Attribute-Based, Advances in Cryptology, CRYPTO 2013, Lecture Notes in Computer Science, Volume 8042, 2013, pp. 75-92.

[GGH97] O. Goldreich, S. Goldwasser, and S. Halevi; Public-key cryptosystems from lattice reduction Problems, Advances in Cryptology—CRYPTO 1997, Lecture Notes in Computer Science, Vol. 1294, pages 112-131, Springer, 1997.

[GM] S. Goldwasser, S. Micali; Probabilistic Encryption, Journal of Computer and System Sciences 28, 1984, pp. 270-299.

[GP04] D. Grigoriev, I. Ponomarenko; Homomorphic Public-Key Cryptosystems over Groups and Rings, Quaderni di Mathematica, Vol 13, 2004, pp. 304-325.

[HaGeVa] U.S. Pat. No. 8,861,716 B2; Vinod 08861716 C1. 380-28; Efficient homomorphic encryption scheme for bilinear forms; Shai Halevi, Elmsford, N.Y. (US); Craig B. Gentry, New York, N.Y. (US); and Vinod Vaikuntanathan, White Plains, N.Y. (US); Assigned to International Business Machines Corporation, Armonk, N.Y. (US)

[HaGe13] US20120039473 A1; Efficient implementation of fully homomorphic encryption Gentry; Craig B. (New York, N.Y.), Halevi; Shai (Elmsford, N.Y.), Assigned to International Business Machines Corporation, Armonk, N.Y. (US)

[HS14a] S. Halevi and V. Shoup; Algorithms in HElib, J. A. Garay and R. Gennaro, editors; CRYPTO 2014, Part I, Lecture Notes in Computer Science, Vol. 8616, pp. 554-571, Springer, 2014.

[HS14b] S. Halevi and V. Shoup; Bootstrapping for HElib, IACR Cryptology ePrint Archive, http://eprint.iacr.org/2014/873, 2014.

[HPS98] J. Hoffstein, J. Pipher, J. H. Silverman; NTRU: A Ring Based Public Key Cryptosystem, Algorithmic Number Theory (ANTS III), Portland, Oreg., June 1998, Lecture Notes in Computer Science 1423 (J. P. Buhler, ed.), Springer-Verlag, Berlin, 1998, pp. 267-288.
[HPS01] J. Hoffstein, J. Pipher, J. H. Silverman; NSS: an NTRU lattice-based signature scheme, Advances in cryptology—EUROCRYPT 2001 (Innsbruck), Lecture Notes in Computer Science, Volume 2045, Springer, 2001, pp. 211-228.
[PaClass] V. Pasol; Classifying Fully Homomorphic Encryption Schemes, preprint.
[RAD78] R. Rivest, L. Adleman, M. Dertouzos; On data banks and privacy homomorphisms, In Foundations of Secure Computation, Academic Press, 1978, pp. 169-177.
[R05] O. Regev; On lattices, learning with errors, random linear codes, and cryptography, in STOC, pp. 84-93, 2005.
[Ro11] R. Rothblum; Homomorphic Encryption: From Private-Key to Public-Key, Theory of Cryptography, Lecture Notes in Computer Science, Vol. 6597, 2011, pp. 219-234.
[RSA78] R. Rivest, A. Shamir, and L. Adleman; A method for obtaining digital signatures and public-key cryptosystems, in Communications of the ACM, 21(2), pages 120-126, 1978.

$\omega_p$, $\omega_q$=third root of unity mod p, respectively mod q
$\pi_p$, $\pi_q$=projection map from mod N to mod p, respectively to mod q
$\eta$=unique element mod N such that $\pi_p(\eta)=\omega_p$ and $\pi_q(\eta)=\omega_q$
sk, Sk=secret key
$\phi$=Monoid homomorphism
$\phi_R$=Algebra homomorphism
$\lambda$=security parameter (between 256-2048)
$\chi$=monoid character
$\varepsilon$=Evaluation map
m=plaintext message (for FHE, a bit)
$d=d(\lambda)$=number of zeroes in a fresh ciphertext
$s=s(\lambda)$=size of the secret key Sk
$p_i$=the probability of zero withdrawal on position i
$f_i$=appearance frequency of zero on position i
$M=\{M_1, \ldots, M_n\}$=sequence of natural numbers
$M^i$:=the set M with $M_i$ deleted.
$\varepsilon$=acceptable error (of size $2^{-\lambda}$)
$M=M_1+\ldots+M_n$
$P_M(X):=\Pi(1+M_i X)=\Sigma_d C_d(M) X^d$=the polynomial which computes the relative frequencies of extraction d numbers with no repeating occurrences in the same $M_i$ interval.

$$Q_i(d, M) := \sum_{k=0}^{d-1} \sum_{(j_1,\ldots,j_k)} \left( \prod_{s=1}^{k} \frac{M_{j_s}}{M - M_{j_1} - \ldots - M_{j_{s-1}}} \right) \frac{M_i}{M - M_{j_1} - \ldots - M_{j_k}},$$

[ScVe] J. Scholten, F. Vercauteren; An Introduction to Elliptic and Hyperelliptic Curve Cryptography and the NTRU Cryptosystem; To appear in B. Preneel Ed., State of the Art in Applied Cryptography, COSIC '03, Lecture Notes in Computer Science, Springer, 2004.
[Sen] J. Sen; Homomorphic Encryption: Theory & Application, available at http://arxiv.org/abs/1305.5886.
[Sh97] V. Shoup; Lower bounds for discrete logarithms and related problems, in Advances in Cryptology, EUROCRYPT '97, Lecture Notes in Computer Sciences, Volume 1233, Springer, 1997, pp. 256-266.
[SV10] N. Smart, F. Vercauteren; Fully homomorphic encryption with relatively small key and ciphertext sizes, P. Nguyen and D. Pointcheval, editors, in Public Key Cryptography, volume 6056 of Lecture Notes in Computer Science, Springer, 2010, pp. 420-443.

Glossary

D, Dec=Decryption algorithms
E, Enc=Encryption algorithms
M=Monoid
M'=Monoid
G=Monoid,
H=Monoid,
R=Commutative ring
R[M]=Monoid Algebra
A=R-algebra
S=Im($\chi$), the image of elements in H under the character $\chi$: H$\to$A.
$F_2$=The field with two elements=({0, 1}, AND, XOR)
$\overline{F_2}$=the algebraic closure of $F_2$
$|A^x|$=number of invertible elements in A
p, q=primes
N=pq
(Z/NZ)x, (Z/pZ)x, (Z/qZ)x=the group of invertible elements mod N, mod p respectively mod q
the relative frequencies of extraction of d numbers with rejection with no repeating occurrences in the same M, interval.

What is claimed is:

1. A computer-implemented method for processing a message using a memory, a first device, and a second device, wherein the memory stores:

a monoid encryption scheme consisting a first monoid and a second monoid, the first monoid comprising a ciphertext space and the second monoid comprising a plaintext space, an algorithm for encrypting elements of the plaintext space, and an algorithm for decrypting elements of the ciphertext space, a ring and an algebra over the ring, and a character that is a ring homomorphism from the second monoid to the algebra and a fixed set of elements of the ring which together with a set of images of the character generates the algebra, the method comprising:

receiving the message for encryption at the first device, wherein the first device expresses the message as a linear combination over the second monoid with coefficients in the fixed set of the elements of the ring;

encrypting the message at the first device by applying the monoid encryption scheme with a key to obtain an encrypted message;

outputting, at the first device, the encrypted message in the monoid algebra of the first monoid;

receiving the encrypted message at the second device; and decrypting the encrypted message at the second device by applying the decryption algorithm to each element of the first monoid appearing in a representation of the encrypted message and then the character, in order to compute the decryption as a linear combination.

2. The method of claim 1, further comprising:
sending the encrypted message to a recipient, wherein a decryption operation applied to the encrypted message is homomorphic with respect to both addition and multiplication operations.

3. The method according to claim 2, wherein encryption and decryption are symmetric using an identical key; or asymmetric using a public key and a secret key.

4. The method according to claim 3, wherein the secret key is a bit vector comprising a plurality of bits.

5. The method according to claim 2, wherein the first device and the second device are linked by a network.

6. The method according to claim 2, further comprising:
converting a Boolean circuit consisting only of AND and XOR gates into a polynomial by replacing each AND gate with a multiplication and each XOR gate with an addition; and
evaluating the resulting polynomial at the encrypted message.

7. The method according to claim 1, wherein
the decryption algorithm is homomorphic with respect to both addition and multiplication operations.

8. The method according to claim 1, wherein the processing a message comprises:
starting with the input data:
(G, H, E, D) as the monoid encryption scheme;
$\chi: H \to A$ is a nontrivial R-character;
a ring R and an R-algebra A;
S is a set of values of $\chi$ in A; and
r is part of a fixed tuple $(r_1, \ldots, r_k) \in R^k$, where $k \geq 1$ such that elements of the form $\Sigma\, r_i\, s_i$ and $s_i \in S$ is A; and
algorithms (R[G], A, Enc, Dec),
wherein:
R[G] is a ring,
for a plaintext $m \in A$, let $(h_1, \ldots, h_k) \in H^k$ such that $m = \Sigma r_i\, \chi(h_i)$,
$Enc(m) = \Sigma r_i\, [E(h_i)]$, and
$Dec(\Sigma_{g \in G}\, a_g\, [g]) = \Sigma_{g \in G}\, a_g\, \chi(D(g))$.

9. The method according to claim 8, further comprising:
applying a component-wise probabilistic multiplicative homomorphic encryption scheme onto a multiplicative monoid of a field with two elements during encryption, wherein
n is a positive integer;
a ciphertext space consists of bit vectors of length n,
a secret key of length s, and
an additional parameter d;
encrypting a bit message m at the first device by choosing d random numbers from $\{1, 2, \ldots, n\}$, such that none of them is in the secret key if m=1 and at least one is in the secret key if m=0, wherein the output is a vector of length n with entries 0 on coordinates corresponding to the d chosen numbers and 1 on coordinates not corresponding to the d chosen numbers; and
decrypting a vector of length n at the second device that outputs 0 if at least one secret key position equals 0 and outputs 1 if no secret key position equals 0.

10. The method according to claim 1, wherein the message to be encrypted is written as a linear combination of post messages, individual messages, or submessages, and the encrypted message is obtained as a linear combination of encrypted post messages, individual messages, or submessages.

11. The method according to claim 1, further comprising:
compressing an encrypted message to reduce its size; and
sending the compressed encrypted message to a recipient.

12. The method according to claim 1, further comprising:
dividing an encrypted message into two or more message parts, and sending the encrypted message parts together or separately to a recipient.

13. The method according to claim 12, further comprising:
receiving and decrypting encrypted message parts by the recipient, and combining the decrypted message parts to obtain the original message.

14. A non-transitory computer-readable storage device embodied in a memory interacting with a first device and a second device for processing a message, wherein the memory stores:
a monoid encryption scheme consisting a first monoid and a second monoid, the first monoid comprising a ciphertext space and the second monoid comprising a plaintext space, an algorithm for encrypting elements of the plaintext space, and an algorithm for decrypting elements of the ciphertext space,
a ring and an algebra over the ring, and
a character that is a ring homomorphism from the second monoid to the algebra and a fixed set of elements of the ring which together with a set of images of the character generates the algebra,
the non-transitory computer-readable storage device tangibly embodying a program of computer code instructions which, when executed by a processor, causes the processor to:
receive the message for encryption at the first device, wherein the first device expresses the message as a linear combination over the second monoid with coefficients in the fixed set of the elements of the ring;
encrypt the message at the first device by applying the monoid encryption scheme with a key to obtain an encrypted message;
output, at the first device, the encrypted message in the monoid algebra of the first monoid;
receive the encrypted message at the second device; and
decrypt the encrypted message at the second device by applying the decryption algorithm to each element of the first monoid appearing in a representation of the encrypted message and then the character, in order to compute the decryption as a linear combination.

15. The non-transitory computer-readable storage device according to claim 14, wherein the computer-readable storage device further tangibly embodies computer code instructions for decrypting the encrypted message by a same or a different processor using a decryption algorithm, wherein the decryption algorithm comprises an operation which is homomorphic with respect to both addition and multiplication operations.

16. The non-transitory computer-readable storage device according to claim 14, wherein the computer-readable storage device further tangibly embodies computer code instructions for the processing a message,
starting with the input data:
(G, H, E, D) as the monoid encryption scheme;
$\chi: H \to A$ is a nontrivial R-character;
a ring R and an R-algebra A;
S is a set of values of $\chi$ in A; and
r is part of a fixed tuple $(r_1, \ldots, r_k) \in R^k$, where $k \geq 1$ such that elements of the form $\Sigma\, r_i\, s_i$ and $s_i \in S$ is A; and
algorithms (R[G], A, Enc, Dec),
wherein:
R[G] is a ring, for a plaintext $m \in A$, let $(h_1, \ldots, h_k) \in H^k$ such that
 $m = \Sigma r_i \chi(h_i)$,
$\text{Enc}(m) = \Sigma r_i [E(h_i)]$, and
$\text{Dec}(\Sigma_{g \in G} a_g [g]) = \Sigma_{g \in G} a_g \chi(D(g))$.

\* \* \* \* \*

UNITED STATES PATENT AND TRADEMARK OFFICE
CERTIFICATE OF CORRECTION

PATENT NO. : 10,454,668 B2
APPLICATION NO. : 14/936097
DATED : October 22, 2019
INVENTOR(S) : Vicentiu Pasol et al.

Page 1 of 1

It is certified that error appears in the above-identified patent and that said Letters Patent is hereby corrected as shown below:

In the Claims

Column 25, Claim 16, Line 4 replace:

" $\operatorname{Dec}(\sum_{g \in G} a_g [g]) = \sum_{g \in G} a_g \operatorname{x}(D(g))$. "

With:

-- $\operatorname{Dec}(\sum_{g \in G} a_g [g]) = \sum_{g \in G} a_g \chi(D(g))$. --

Signed and Sealed this
Third Day of December, 2019

Andrei Iancu
*Director of the United States Patent and Trademark Office*